United States Patent
Gyland et al.

(10) Patent No.: US 11,876,577 B2
(45) Date of Patent: Jan. 16, 2024

(54) INDUCTIVE COMMUNICATION UNIT, AN INDUCTIVE COMMUNICATION SYSTEM, A COMMUNICATION ARRANGEMENT FOR USE IN TWO-WAY COMMUNICATION, A METHOD OF COMMUNICATING DATA, AND USE OF SUCH UNIT, SYSTEM AND ARRANGEMENT

(71) Applicant: WPC Wireless Power and Communication AS, Kristiansand (NO)

(72) Inventors: Geir Olav Gyland, Kristiansand (NO); Karsten Husby, Trondheim (NO)

(73) Assignee: WPC Wireless Power and Communication AS, Kristiansand (NO)

( * ) Notice: Subject to any disclaimer, the term of this patent is extended or adjusted under 35 U.S.C. 154(b) by 323 days.

(21) Appl. No.: 17/437,099

(22) PCT Filed: Mar. 11, 2020

(86) PCT No.: PCT/NO2020/050065
§ 371 (c)(1),
(2) Date: Sep. 8, 2021

(87) PCT Pub. No.: WO2020/185091
PCT Pub. Date: Sep. 17, 2020

(65) Prior Publication Data
US 2022/0182104 A1 Jun. 9, 2022

(30) Foreign Application Priority Data
Mar. 13, 2019 (NO) .................................. 20190336

(51) Int. Cl.
*H04B 5/00* (2006.01)
*H01Q 7/00* (2006.01)

(52) U.S. Cl.
CPC ............. *H04B 5/0081* (2013.01); *H01Q 7/00* (2013.01); *H04B 5/0093* (2013.01)

(58) Field of Classification Search
CPC .. H04B 5/0081; H04B 5/0093; H04B 5/0075; H04B 13/02; H01Q 7/00; H04W 4/80
(Continued)

(56) References Cited

U.S. PATENT DOCUMENTS

| | | |
|---|---|---|
| 8,548,597 B2 | 10/2013 | Dai |
| 8,681,000 B2 | 3/2014 | August et al. |

(Continued)

FOREIGN PATENT DOCUMENTS

GB 2475842 6/2011

OTHER PUBLICATIONS

International Search Report and the Written Opinion for PCT/NO2020/050065, dated Jun. 12, 2020.
(Continued)

*Primary Examiner* — Shaima Q Aminzay
(74) *Attorney, Agent, or Firm* — Andrus Intellectual Property Law, LLP (57) ABSTRACT

An inductive communication unit is for use in two-way communication. The unit has a transmitter coil configured to generate a first alternating magnetic field representing first information to be transmitted, and a receiver coil configured to receive a second magnetic field representing second information to be received. The transmitter coil and the receiver coil are arranged extending in parallel in vicinity to each other and positioned overlapping each other in part to an extent that, upon exposure of the first alternating magnetic field to the receiver coil, an overlapping portion of the receiver coil induces a first current and a nonoverlapping
(Continued)

portion of the receiver coil induces a second current, and where the first and the second currents are of same magnitude and opposite polarity.

17 Claims, 4 Drawing Sheets

(58) Field of Classification Search
USPC .......................................................... 455/41.1
See application file for complete search history.

(56) References Cited

U.S. PATENT DOCUMENTS

| | | |
|---|---|---|
| 2011/0193418 A1 | 8/2011 | Hennig et al. |
| 2016/0025821 A1 | 1/2016 | Widmer et al. |
| 2016/0285317 A1 | 9/2016 | Maniktala |
| 2016/0380365 A1 | 12/2016 | Helbers |
| 2017/0179773 A1* | 6/2017 | Kim ..................... H01F 27/366 |
| 2017/0180009 A1 | 6/2017 | McManus et al. |
| 2017/0187197 A1 | 6/2017 | Tan et al. |
| 2018/0304119 A1 | 10/2018 | Yang et al. |

OTHER PUBLICATIONS

Corrected International Search Report and the Written Opinion for PCT/NO2020/050065, dated Jun. 29, 2020.
Li et al., "A Survey of Underwater Magnetic Induction Communications: Fundamental Issues, Recent Advances, and Challenges" vol. 21, Issue: 3, 2019.

* cited by examiner

INDUCTIVE COMMUNICATION UNIT, AN INDUCTIVE COMMUNICATION SYSTEM, A COMMUNICATION ARRANGEMENT FOR USE IN TWO-WAY COMMUNICATION, A METHOD OF COMMUNICATING DATA, AND USE OF SUCH UNIT, SYSTEM AND ARRANGEMENT

CROSS-REFERENCE TO RELATED APPLICATIONS

This application is the U.S. national stage application of International Application PCT/NO2020/050065, filed Mar. 11, 2020, which international application was published on Sep. 17, 2020, as International Publication WO 2020/185091 in the English language. The International Application claims priority of Norwegian Patent Application No. 20190336, filed Mar. 13, 2019. The international application and Norwegian application are both incorporated herein by reference, in entirety.

INTRODUCTION

The present invention relates to an inductive communication unit for use in two-way communication. The communication unit comprises a transmitter coil configured to generate a first alternating magnetic field representing first information to be transmitted, and a receiver coil configured to receive a second magnetic field representing second information to be received.

The present invention further relates to a communication system comprising at least two communication units, a communication arrangement comprising a at least two communication systems arranged next to each other, a method of communicating data, and use of such unit, system and arrangement.

PRIOR ART

Prior art wireless communication systems are used for various applications, such as wireless connections of laptops, smartphones and tablets. The systems are generally based on use of electromagnetic waves, where the distance between the transmitters and receivers are separated at distance from meters to several kilometres.

A problem with such communication systems is that they are not suitable to be used at short distances between antennas, where near field effects causes interference of the propagation of the electromagnetic waves. Furthermore, such communication systems have the disadvantage of dispersion of electromagnetic waves to adjacent units resulting in interference or other communication problems.

In various applications there is a need for a communication system where units at short distances sporadically are to be connected and disconnected in environments where wired communication are not suitable, such as in subsea applications.

SUMMARY OF THE INVENTION

The invention has for its object to remedy or to reduce at least one of the drawbacks of the prior art, or at least provide a useful alternative to prior art. In particular, an object of the invention is to provide a communication unit for use in two-way communication at short distance between units, with high information transfer rates in same frequencies, and with low energy consumption.

This object is obtained by means of an inductive communication unit for use in two-way communication. The communication unit comprises:
    a transmitter coil configured to generate a first alternating magnetic field representing first information to be transmitted, and
    a receiver coil configured to receive a second magnetic field representing second information to be received.

The communication unit is characterized in that the transmitter coil and the receiver coil are arranged extending in parallel or essentially parallel in vicinity to each other and positioned overlapping each other in part to an extent that, upon exposure of the first alternating magnetic field to the receiver coil, an overlapping portion of the receiver coil induces a first current and a nonoverlapping portion of the receiver coil induces a second current, wherein the first and the second currents are of same magnitude and opposite polarity.

The transmitter coil is configured to transmit the first information by means of that the transmitter coil generates the first alternating magnetic field that is configured to be received by the receiver coil of a corresponding communication unit. The communication unit further comprises the receiver coil that correspondingly is configured to be exposed to a second magnetic field representing second information generated by the corresponding communication unit.

In the process of generating the first alternating magnetic field, the receiver coil of the same communication unit is also exposed to the first alternating magnetic field. The problem of interference between the transmitter coil and the receiver coil of the same unit is resolved by means of arranging the transmitter coil and the receiver coil parallel in vicinity to each other and overlapping each other in part to an extent that the overlapping portion of the receiver coil induces the first current and the nonoverlapping portion of the receiver coil induces the second current. The first current and second current are of same magnitude and opposite polarity, and consequently the first current and second current compensating each other resulting in a zero contribution in the receiver coil. Thereby, the communication unit of the invention enables two-way communication at short distance between the corresponding units and in the same frequencies transmitted and received without interference.

The use of inductive communication units has further the advantage of providing a magnetic field with little dispersion, enables two-way communication with low energy consumption. Furthermore, a plurality of pairs of communication units to be positioned next to each other without interference.

According to an embodiment of the invention, the overlapping portion constitutes 9-16%, preferably 11-13% of an enclosed area of the transmitter coil. The term "enclosed area" is to be understood as the area in which the transmitter coil is extending.

According to an embodiment of the invention, the transmitter coil forms a first enclosed area and the receiver coil forms a second enclosed area, wherein the first area and the second area have a different size or substantially the same size.

According to an embodiment of the invention, the transmitter coil and the receiver coil have the same size and shape, wherein the transmitter coil and the receiver coil are positioned so that, when viewed perpendicular to their extension, they are collectively forming a contour comprising a central portion constituting the overlapping portion and a peripheral portion constituting the nonoverlapping portion, wherein the peripheral portion comprises two or more branches extending symmetrically from said central portion. Alternatively, the transmitter coil and the receiver coil have different size.

By means of the formed contour by the transmitter coil and the receiver coil, interference in the received signal is reduced. The interference in the received signal occurs due to deviation in position and orientation between the communication unit and a corresponding communication unit from an optimal position and orientation.

Furthermore, the contour assures that the first current and second current in the overlapping portion are essentially of the same magnitude and opposite polarity. Deviation in the first current and second current occurs due to deviation in position and orientation between the communication unit and a corresponding communication unit from an optimal position and orientation.

According to an embodiment of the invention, the peripheral portion comprises two or more pairs of branches. As large number of branches as possible is preferable for reducing the interference due to deviation in position and orientation.

According to an embodiment of the invention, a part of the peripheral portion comprises a circular rim portion.

According to an embodiment of the invention, the central portion comprises a centre point with two or more pairs of protruding segments protruding away from the centre point. As large number of protruding segments as possible is preferable for reducing the differenced in the first current and second current due to deviation in position and orientation.

According to an embodiment of the invention, the central portion comprises a centre point and said branches extending symmetrical in a direction away from the central point.

According to an embodiment of the invention, the collectively formed contour is shaped according to any of FIG. 4a-4f.

According to an embodiment of the invention, the transmitter coil is configured to receive said second magnetic field from a transmitter coil of a corresponding communication unit arranged so that the coils are separated at a distance less than two times a diameter of the transmitter coil and a distance more than 0.01 times the diameter of the transmitter coil.

According to an embodiment of the invention, the transmitter coil is configured to receive said second magnetic field from a transmitter coil of a corresponding communication unit arranged so that the coils are separated at distance between 1 mm to 200 mm, preferably 1 mm to 100 mm.

According to an embodiment of the invention, the communication unit is configured to receive a communication protocol comprising the first information to be transmitted. The communication unit can provide a first alternating current to be conducted to the transmitter coil for producing the first alternating magnetic field.

Optionally, the data signal may be filtered or amplified or prepared in another way e.g. for optimising data transfer speed or for conditioning the signal, e.g. to an optimised frequency band. The communication unit can thus further comprise an amplifier for amplifying the signal, or a signal preparer for correcting, shaping, filtering, or adapting the signal, e.g. to within the desired frequency band for transmission, or other preparation of the signal. The data signal is preferably a base band signal. Accordingly, the data signal is preferably unmodulated. However, the data signal could be modulated in various embodiments, in which case the communication unit may further comprise a modulator for modulating the signal.

According to an embodiment of the invention, the first alternating current is configured to generate the first alternating current within a wavelength interval, wherein a largest length of the transmitter coil is less or equal to one-fourth the lowest wavelength of the interval. The largest length of the transmitter coil relates to the largest extension of a loop or curvature of the transmitter coil.

According to an embodiment of the invention, the first alternating current has a frequency in the interval of 30 MHz to 800 Mhz.

According to an embodiment of the invention, the communication protocol is selected from at least one of Ethernet and SERDES.

According to an embodiment of the invention, the communication protocol is SERDES and the first alternating current is configured to be generated in the interval between 30 MHz to 800 MHz, resulting in a speed of transmission of approximately 1 Gbit/s.

According to an embodiment of the invention, the communication unit is configured to provide the first alternating field directly on basis of said communication protocol. By the term "generate the first alternating field directly" is to be understood that the first alternating field is generated without modulation in its baseband. Thereby, the available frequency by the communication unit is used for the transmission. The lower frequency is preferable for use in salt water, such as in subsea application. Furthermore, it has the advantage of providing low dispersion of the induced alternating magnetic field, which allows a plurality of communication units to be arranged next to each other without interference.

According to an embodiment of the invention, the communication unit comprises a balun for balancing the signal to the transmitter coil and from the receiver coil.

According to an embodiment of the invention, the information transmitted by the first alternating current has a speed of transmission in the interval of 100 Mbit/s to 50 Gbit/s. The first alternating current preferably comprises one or more frequencies in the interval of 30 MHz to 800 MHz for transmission of information with a transmission speed of up to around 1 Gbit/s.

According to an embodiment of the invention, the frequency or frequencies of the first alternating current is/are preferably lower than or different from the resonance frequency or frequencies of the transmitter coil and/or the receiver coil. By means of employing the transmission of information sufficiently outside of the one or more resonance frequencies, the bandwidth of the transmission is improved.

According to an embodiment of the invention, the communication unit comprises a first amplifier configured to amplify the first alternating current of the communications protocol to be conducted to the transmitter coil. The first amplifier is configured to amplify the first alternating current to a suitable magnitude for the induction of the first alternating magnetic field in the transmitter coil.

According to an embodiment of the invention, the communication unit is configured to receive second alternating current induced by the second magnetic field in the receiver coil and transmit a communication protocol comprising the second information.

According to an embodiment of the invention, the communication unit comprises a second amplifier configured to amplify the second alternating current. The second amplifier is configured to amplify the second alternating current to a suitable magnitude for it to be processable for extracting the second information.

According to an embodiment of the invention, the second amplifier is configured to amplify the second alternating current to a predetermined level, which predetermined level correspond to a known level of the communications protocol that was conducted. Thereby, the transmitted level of the communication protocol is same as the communication protocol produced by the corresponding communication unit.

According to an embodiment of the invention, the second amplifier is configured to provide automatic gain control of the second alternating current.

According to an embodiment of the invention, the transmitter coil and the receiver coil are connected by means of a respective cable, and wherein the transmitter coil and the receiver coil comprises a ground connection at a mid-portion of the coils. Thereby, the communication unit can be used for transmitting at a larger separation between the communication unit and the corresponding communication unit.

According to an embodiment of the invention, the communication unit is configured to generate a further alternating current and the first amplifier is configured to amplify the further alternating current to a further level of amplification, which further alternating current and further level of amplification are optimized for energy transmission.

The communication unit can be configured in a first mode of operation for transmission of information and a second mode for transmission of energy between the communication unit and another such communication unit. The transmitted wireless energy can for example be used for the communication unit or a component connected to the communication unit.

The object of the invention is further obtained by means of an inductive communication system for two-way communication. The system comprises at least two communication units according to any of above embodiments, wherein the respective transmitter coils and receiver coils of the two units are arranged extending in parallel or essentially parallel.

According to an embodiment of the invention, the respective transmitter coils and receiver coils of the two units are separated at a distance less than two times a diameter of one of the transmitter coils and a distance more than 0.01 times the diameter of said one transmitter coil.

According to an embodiment of the invention, the respective transmitter coils and receiver coils of the two units are separated at distance between 1 mm to 200 mm, preferably 1 mm to 100 mm.

The object of the present invention is further obtained by means of communication arrangement for two-way communication. The arrangement comprises a plurality of communication systems according to any of above embodiments, and wherein the communication systems are positioned adjacent to each other.

The object of the present invention is further obtained by means of use of a communication unit according to any of above embodiments.

According to an embodiment of the invention, the communication unit is employed submerged in salt water, such as in subsea application.

The object of the present invention is further obtained by means of use of an inductive communication system according to any of above embodiments.

According to an embodiment of the invention, the inductive communication system is employed submerged in salt water, such as in subsea application.

According to an embodiment of the invention, the communication system is in two-way communication in the same frequency interval.

The object of the present invention is further obtained by a method of communicating data between a first communication unit in accordance with any of the above embodiments and a second communication unit in accordance with any of the above embodiments, the method comprising the steps of: transmitting first information from the first communication unit to the second communication unit; and transmitting second information from the second communication unit to the first communication unit.

According to an embodiment of the invention, the method comprises transmitting the first information and the second information in the same frequency interval.

The information in either direction can be transmitted by baseband signal transmission. The information in either direction can be transmitted comprising a communication protocol, such as Ethernet and SERDES.

BRIEF DESCRIPTION OF DRAWINGS

In the following is described examples of preferred embodiments illustrated in the accompanying drawings, wherein.

DETAILED DESCRIPTION OF THE INVENTION

Figure 1:
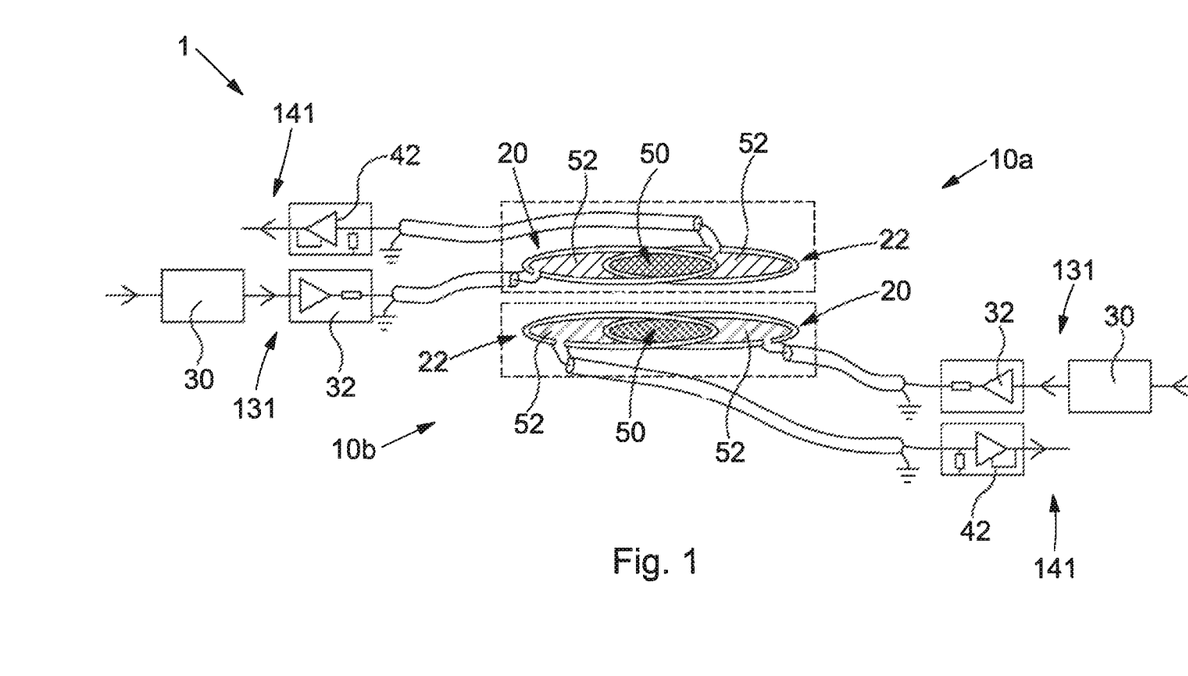
FIG. 1 discloses an inductive communication system according to an embodiment of the invention.

In FIG. 1 is an inductive communication system 1 for two-way communication according to an embodiment of the invention disclosed. The system 1 comprises a first inductive communication unit 10a and a second inductive communication unit 10b that are arranged next to each other.

In the following the system 1 will be explained. For the purpose of simplicity, the first communication unit 10a and second communication unit 10b will be assumed to have corresponding features and configurations. However, it shall be understood that the two units 10a, 10b may have differences in their features that still enables two-way communication with the technical effect of the invention.

The first communication unit 10a comprises a transmitter coil 20 and a receiver coil 22. Correspondingly, the second communication unit 10b comprises a transmitter coil 20 and a receiver coil 22. First information is to be transmitted from the first communication unit 10a to the second communication unit 10b. Correspondingly, second information is to be transmitted from the second communication unit 10b to the first communication unit 10a.

The transmitter coil 20 of the first communication unit 10a is configured to generate a first magnetic field representing the first information to be transmitted to the receiver coil 22 of the second communication unit 10b. Correspondingly, the receiver coil 22 of the first communication unit 10a is configured to receive a second magnetic field representing second information to be received. The second magnetic field is generated by the transmitter coil 20 of the second communication unit 10b.

The communication unit 10a has input means 131 for providing the transmitter 20 with a first alternating current in the form of a data signal for communicating the first information from the transmitter 20 of the first communication unit 10a to the receiver 22 of the second communication unit 10b. The first magnetic field is generated according to the first alternating current conducted in the transmitter 20 of the first communication unit 10a. The first magnetic field induces a current in the receiver 22 of the second communication unit 10b, and in this way the first information by way of the data signal can be communicated from the one unit to the other.

Optionally, the input means 131 comprises a first signal preparer 30 and a first amplifier 32. The signal preparer 30 is configured to receive a communication protocol comprising the first information to be transmitted. The preparer 30 is configured to prepare and finetune the signal, e.g. filter, correct, and optimise it and provide the first alternating current based on the prepared signal that is conducted to the first amplifier 32. It should be noted that the preparer 30 in this example does not modulate the signal.

The first amplifier 32 receives and amplifies the first alternating current that is conducted to the transmitter coil 20 of the first communication unit 10a that induces the first alternating magnetic field. The first amplifier 32 is configured to amplify the first alternating current to a suitable magnitude for providing the first alternating magnetic field in the transmitter coil 20 and inductively communicating the first information to the second communication unit 10b.

The first communication unit 10a includes output means 141 which optionally includes. a second amplifier 42 associated with the receiver coil 22. A second alternating current is induced by the second magnetic field in the receiver coil 22.

The second alternating current is, in this example, conducted through a second amplifier 42. The second amplifier 42 is configured to amplify the second alternating current to a suitable magnitude for processing.

The communication unit 10a is configured to receive the second alternating current induced by the second magnetic field in the receiver coil 22 and transmit a communication protocol comprising the second information.

The transmitter coil 20 and the receiver coil 22 of the first communication unit 10a are arranged extending in parallel in vicinity to each other and positioned overlapping each other in part. The function of the first alternating magnetic field generated by the transmitter coil 20 of the first communication unit 10a is to expose the receiver coil 22 of the second communication unit 10b to the magnetic field for purpose of transmitting the first information from the first communication unit 10a to the second communication unit 10b. However, in the process of this also the receiver coil 22 of the first communication unit 10a is exposed to the first alternating magnetic field, which would cause interference if the first information and the second information are in the same frequency interval.

To enable two-way communication in the same frequency interval, the transmitter coil 20 and the receiver coil 22 of the first communication unit 10a are arranged extending in parallel in or essentially in parallel in vicinity to each other and positioned overlapping each other in part to an extent that, upon exposure of the first alternating magnetic field to the receiver coil 22, an overlapping portion 50 of the receiver coil 22 induces a first current and a nonoverlapping portion 52 of the receiver coil 22 induces a second current, wherein the first and the second currents are of same magnitude and opposite polarity.

By means of the configuration of the first communication unit 10, the first current and second current are compensating each other resulting in a zero or close to contribution in the receiver coil 22. Accordingly, the first communication unit 10a enables two-way communication in the same frequency interval of the first alternating magnetic field transmitted as the frequency of the second alternating magnetic field received.

The transmitter coil 20 and the receiver coil 22 comprises a conductive material suitable for inducing a magnetic field. The transmitter coil 20 and the receiver coil 22 are preferably attached to a fixture of a non-conductive material, such as a circuit board. The overlapping portion between the transmitter coil 20 and the receiver coil 22 are distanced by a spacing for assuring non-conductive contact between the coils 20, 22. The separation is for example filled with a non-conductive material.

In an embodiment of the invention, the overlapping portion 50 constitutes 9-16%, preferably 11-13% of an enclosed area of the transmitter coil 20.

According to a further embodiment of the invention, the transmitter coil 20 and the receiver coil 22 of the first communication unit 10a and the second communication unit 10b are separated at a distance less than two times a diameter of the transmitter coil 20 and a distance more than 0.01 times the diameter of the transmitter coil 20.

Generally, the invention is related to two-way communication where the two units are separated at short distances. According to an embodiment of the invention, the transmitter coil 20 and the receiver coil 22 of the first communication unit 10a and the second communication unit 10b are separated at distance between 1 mm to 200 mm, preferably 1 mm to 100 mm.

According to an embodiment of the invention, the first signal preparer 30 is configured to generate the first alternating current within a wavelength interval, wherein a largest length of the transmitter coil 20 is less or equal to one-fourth the lowest wavelength of the interval. The largest length of the transmitter coil 20 relates to the largest extension of a loop or curvature of the coil 20.

Above mentioned communication protocol is for example Ethernet or SERDES. The first signal preparer 30 is configured to generate the first alternating current at a frequency between 30 MHz and 800 Mhz.

According to an embodiment of the invention, the communication protocol is SERDES and the first signal preparer 30 is configured to generate the first alternating current in the interval between 30 MHz to 800 MHz, resulting in a speed of transmission of approximately 1 Gbit/s.

Figure 2A:
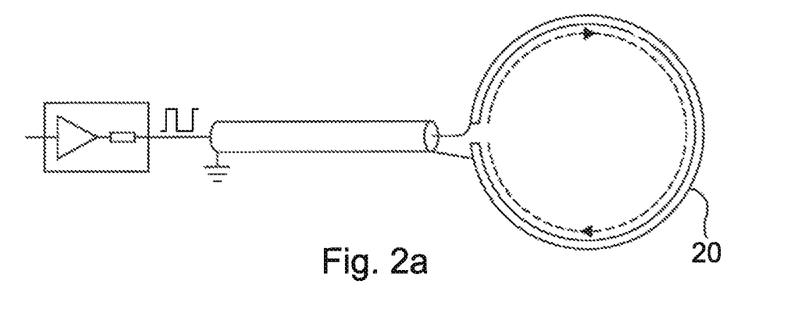
FIG. 2a-c discloses embodiments of connection arrangements of a transmitter coil of a communication unit of the system in FIG. 1.
Figure 2B:
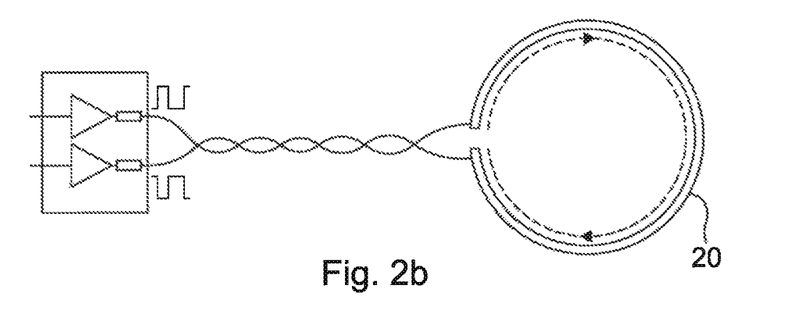
Figure 2C:
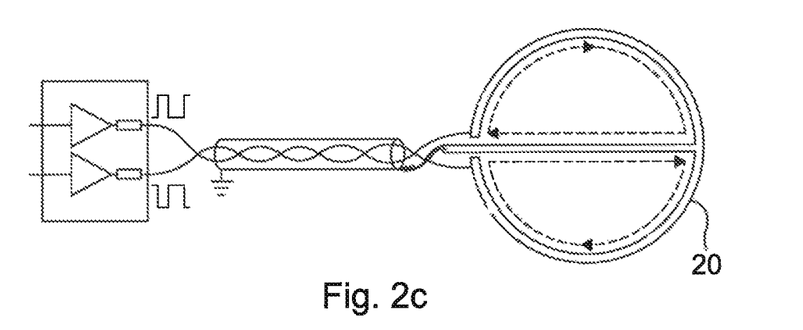

In FIG. 2a-c are embodiments of connection arrangements of a transmitter coil 20 of a communication unit 10a, 10b of the system 1 in FIG. 1 disclosed. In FIGS. 2a and 2b, the transmitter coil 20 is in the form of a circular coil. In FIG. 2c, the transmitter coil 20 is connected to a cable comprising a ground connection. The ground connection is connected to at a midportion of the transmitter coil 20.

Figure 3A:
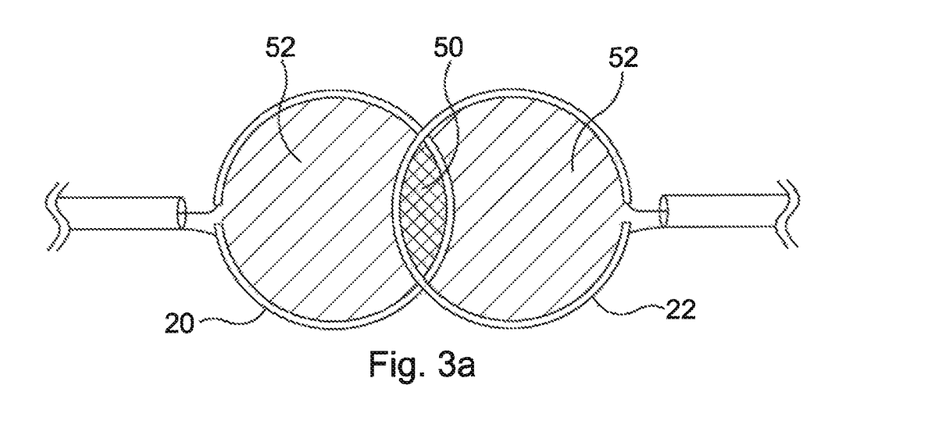
FIG. 3a-c discloses embodiments of overlap between a transmitter coil and a receiver coil of a communication unit of the system in FIG. 1.
Figure 3B:
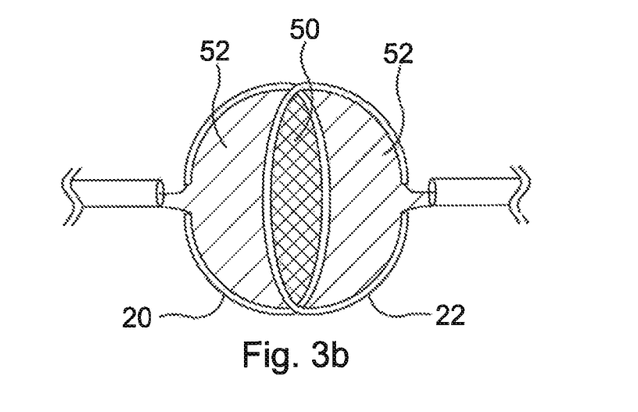
Figure 3C:
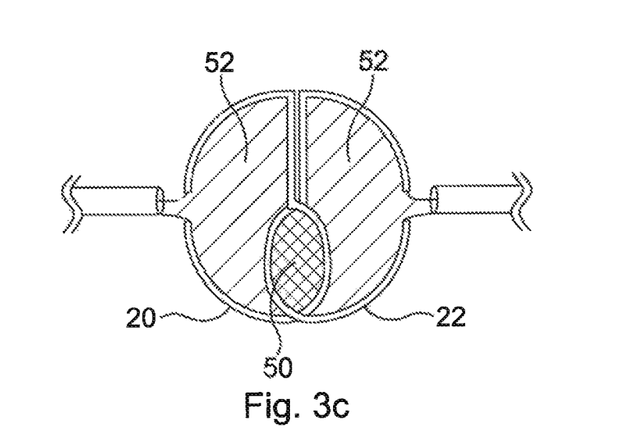

In FIG. 3a-c are embodiments of overlapping portion 50 and nonoverlapping portion 52 between the transmitter coil 20 and the receiver coil 22 of a communication unit 10a, 10b of the system 1 in FIG. 1 disclosed.

In FIG. 4a-f are embodiments of contours formed by the transmitter coil and the receiver coil of a communication unit of the system in FIG. 1 disclosed. The transmitter coil is illustrated with a circle dotted line and receiver coil 22 is illustrated with a square dotted line.

The contour relates to the collectively formed contour of the transmitter coil 20 and the receiver coil 22, when viewed perpendicular to their extension of the coils 20, 22. That is, the direction of separation between the first communication unit 10a and the second corresponding unit 10b.

The contour comprising a central portion 60 constituting the overlapping portion 50. In FIG. 4a-f, the central portion 60 is indicated hatch surface. The contour further comprising a peripheral portion 62 constituting the nonoverlapping portion 52. The peripheral portion 62 is illustrated as a while surface without hatching.

Figure 4A:
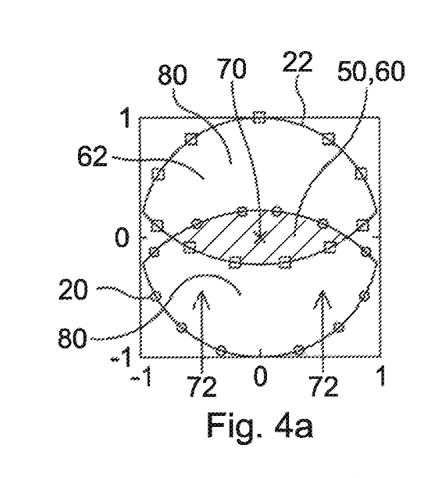
FIG. 4a-f discloses embodiments of contours formed by the transmitter coil and the receiver coil of a communication unit of the system in FIG. 1.
Figure 4B:
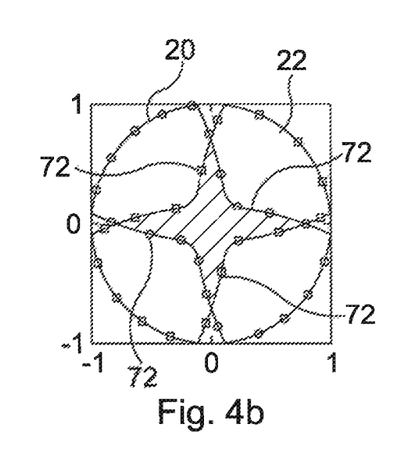
Figure 4C:
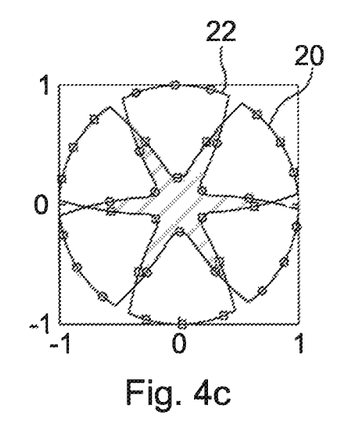
Figure 4D:
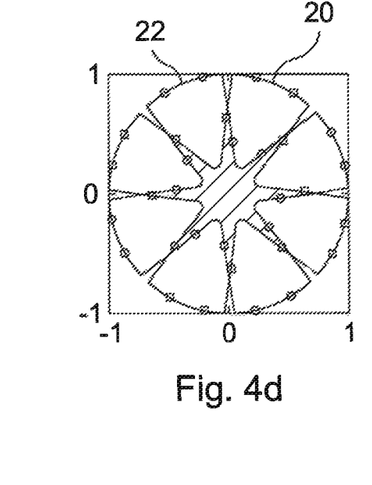
Figure 4E:
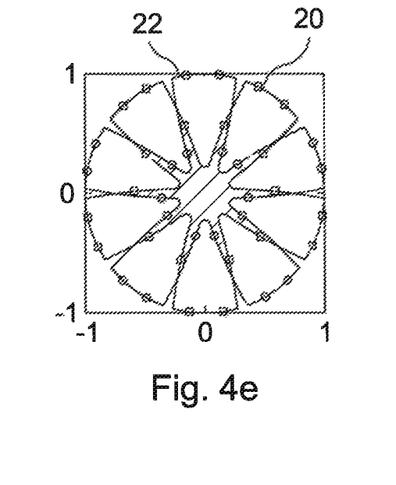
Figure 4F:
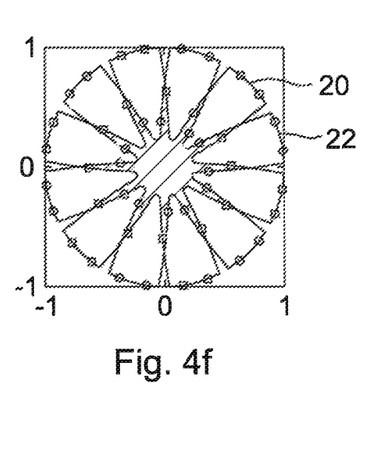

The central portion 60 comprises a centre point 70 with two or more pairs of protruding segments 72 protruding away from the centre point 70. In FIG. 4a-f the following numbers of protruding segments 72 are seen:

in FIG. 4a two protruding segments 72, in FIG. 4b four protruding segments 72, in FIG. 4c six protruding segments 72, in FIG. 4d eight protruding segments 72, in FIG. 4e ten protruding segments 72, and in FIG. 4f twelve protruding segments 72. It shall be understood that central portion 60 correspondingly may be configured with further pairs of protruding segments 72.

Similarly, the peripheral portion 62 comprises pairs of branches 80 extending symmetrical in a direction away from the central point 70. In FIG. 4a-f the following numbers of branches 80 are seen:

in FIG. 4a two branches 80, in FIG. 4b four branches 80, in FIG. 4c six branches 80, in FIG. 4d eight branches 80, in FIG. 4e ten branches 80, and in FIG. 4f twelve branches 80. It shall be understood that central portion 60 correspondingly may be configured with further pairs of branches 80. It shall be understood that the peripheral portion 62 correspondingly may be configured with further pairs of branches 80.

By means of the formed contour by the transmitter coil 20 and the receiver coil 22, the interference in the received signal due to that the first communication unit 10a and second communication unit 10b are not fully oriented parallel or at optimal distance is reduced. For example, the interference that would result from a displacement or rotation of the first communication unit 10a and the second communication unit 10b, resulting in the transmitter coil 20 and the receiver coil 22 not being aligned, is counteracted by the branches 80.

It shall be understood that as large number of branches 80 as possible is preferable for reducing such interference. However, the complexity and cost or the coils 20, 22 also increases with increasing number of branches 80.

Correspondingly, the two or more pairs of protruding segments 72 of the central portion 60 assures that the first current and second current in the overlapping portion 50 are essentially of the same magnitude and opposite polarity even if the first communication unit 10a and second communication unit 10b are not fully oriented in parallel. For example, differences in the first current and second current that would result from a displacement or rotation of the first communication unit 10a and the second communication unit 10b, resulting in the transmitter coil 20 and the receiver coil 22 not being aligned, is counteracted by the protruding segments 72.

It shall be understood that as large number of protruding segments 72 as possible is preferable for reducing such difference in the first current and second current. However, the complexity and cost or the coils 20, 22 also increase with increasing number of protruding segments 72.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage.

The invention claimed is:

1. An inductive communication unit for use in two-way communication, wherein the communication unit comprises:
   a transmitter coil configured to generate a first alternating magnetic field representing first information to be transmitted, and
   a receiver coil configured to receive a second magnetic field representing second information to be received,
   wherein the transmitter coil and the receiver coil are arranged extending in parallel in vicinity to each other and positioned overlapping each other in part to an extent that, upon exposure of the first alternating magnetic field to the receiver coil, an overlapping portion induces a first current and a non-overlapping portion induces a second current, wherein the first and the second currents are of same magnitude and opposite polarity,
   wherein the transmitter coil and the receiver coil have the same size and shape, wherein the transmitter coil and the receiver coil are positioned so that, when viewed perpendicular to their extension, they are collectively forming a contour comprising a central portion constituting the overlapping portion and a peripheral portion constituting the nonoverlapping portion, wherein the peripheral portion comprises two or more branches extending symmetrical from said central portion,
   wherein the peripheral portion comprises two or more pairs of branches.

2. The communication unit according to claim 1, wherein the overlapping portion constitutes 9-16%, preferably 11-13% of an enclosed area of the transmitter coil.

3. The communication unit according to claim 2, wherein the transmitter coil forms a first enclosed area and the receiver coil forms a second enclosed area, wherein the first area and the second area have the same or different size.

4. The communication unit according to claim 1, wherein the transmitter coil forms a first enclosed area and the receiver coil forms a second enclosed area, wherein the first area and the second area have the same or different size.

5. The communication unit according to claim 1, wherein the central portion comprises a center point with two or more pairs of protruding segments protruding away from the center point.

6. The communication unit according to claim 1, wherein the central portion comprises a center point and said branches extending symmetrical in a direction away from the center point.

7. The communication unit according to claim 1, wherein the communication unit is configured to receive a communication protocol comprising the first information to be transmitted and provide a first alternating current to be conducted to the transmitter coil for producing the first magnetic field.

8. The communication unit according to claim 7, configured to generate the first alternating current within a wavelength interval, wherein a largest length of the transmitter coil is less or equal to one-fourth of the lowest wavelength of the interval.

9. The communication unit according to claim 1, wherein the transmitter coil and the receiver coil are connected by means of a respective cable, and wherein the transmitter coil and the receiver coil comprises a ground connection at a mid-portion of the coils.

10. An inductive communication system for two-way communication in the same frequency interval, wherein the system comprises at least a first communication unit and a second communication unit, wherein the communication unit comprises:
- a transmitter coil configured to generate a first alternating magnetic field representing first information to be transmitted, and
- a receiver coil configured to receive a second magnetic field representing second information to be received,
wherein the transmitter coil and the receiver coil are arranged extending in parallel in vicinity to each other and positioned overlapping each other in part to an extent that, upon exposure of the first alternating magnetic field to the receiver coil, an overlapping portion induces a first current and a non-overlapping portion induces a second current, wherein the first and the second currents are of same magnitude and opposite polarity,
wherein the transmitter coil and the receiver coil have the same size and shape, wherein the transmitter coil and the receiver coil are positioned so that, when viewed perpendicular to their extension, they are collectively forming a contour comprising a central portion constituting the overlapping portion and a peripheral portion constituting the nonoverlapping portion, wherein the peripheral portion comprises two or more branches extending symmetrical from said central portion,
wherein the peripheral portion comprises two or more pairs of branches,
wherein the respective transmitter coils and receiver coils of the two communication units are arranged extending in parallel.

11. The system according to claim 10, wherein the respective transmitter coils and receiver coils of the two units are separated at a distance less than two times a diameter of one of the transmitter coils and a distance more than 0.01 times the diameter of said transmitter coil.

12. A method of communicating data between a first communication unit and a second communication unit for use in two-way communication, wherein the communication unit comprises:
- a transmitter coil configured to generate a first alternating magnetic field representing first information to be transmitted, and
- a receiver coil configured to receive a second magnetic field representing second information to be received,
wherein the transmitter coil and the receiver coil are arranged extending in parallel in vicinity to each other and positioned overlapping each other in part to an extent that, upon exposure of the first alternating magnetic field to the receiver coil, an overlapping portion induces a first current and a non-overlapping portion induces a second current, wherein the first and the second currents are of same magnitude and opposite polarity,
wherein the transmitter coil and the receiver coil have the same size and shape, wherein the transmitter coil and the receiver coil are positioned so that, when viewed perpendicular to their extension, they are collectively forming a contour comprising a central portion constituting the overlapping portion and a peripheral portion constituting the nonoverlapping portion, wherein the peripheral portion comprises two or more branches extending symmetrical from said central portion,
wherein the peripheral portion comprises two or more pairs of branches, wherein the method comprises the steps of:
transmitting first information from the first communication unit to the second communication unit; and
transmitting second information from the second communication unit to the first communication unit.

13. The method according to claim 12, wherein the method comprises:
transmitting the first information and the second information in the same frequency interval.

14. The method according to claim 13, wherein the information is transmitted by baseband signal transmission.

15. The method according to claim 12, wherein the information is transmitted by baseband signal transmission.

16. The method according to claim 15, wherein the information is transmitted comprising a communication.

17. The method according to claim 12, wherein the information is transmitted comprising a communication protocol.

* * * * *

UNITED STATES PATENT AND TRADEMARK OFFICE
CERTIFICATE OF CORRECTION

PATENT NO. : 11,876,577 B2
APPLICATION NO. : 17/437099
DATED : January 16, 2024
INVENTOR(S) : Geir Olav Gyland et al.

It is certified that error appears in the above-identified patent and that said Letters Patent is hereby corrected as shown below:

In the Claims

Claim 16, Column 12, Line 46, after "communication" insert -- protocol --.

Signed and Sealed this
Twentieth Day of February, 2024

*Katherine Kelly Vidal*

Katherine Kelly Vidal
*Director of the United States Patent and Trademark Office*